United States Patent
Zhou et al.

(10) Patent No.: US 10,700,980 B2
(45) Date of Patent: Jun. 30, 2020

(54) USER TRAFFIC GENERATION METHOD AND APPARATUS

(71) Applicant: HUAWEI TECHNOLOGIES CO., LTD., Shenzhen (CN)

(72) Inventors: Kaiyi Zhou, Shenzhen (CN); Meilong Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/940,993

(22) Filed: Mar. 30, 2018

(65) Prior Publication Data

US 2018/0227233 A1 Aug. 9, 2018

Related U.S. Application Data

(63) Continuation of application No. PCT/CN2016/097245, filed on Aug. 29, 2016.

(30) Foreign Application Priority Data

Sep. 30, 2015 (CN) .......................... 2015 1 0644528

(51) Int. Cl.
*H04L 12/819* (2013.01)
*H04L 29/08* (2006.01)
(Continued)

(52) U.S. Cl.
CPC .......... *H04L 47/21* (2013.01); *G06F 12/0862* (2013.01); *H04L 43/50* (2013.01);
(Continued)

(58) Field of Classification Search
CPC ..... H04L 47/21; H04L 43/50; H04L 67/2842; H04L 49/9042; G06F 12/0862; G06F 2212/1021; G06F 2212/6026
See application file for complete search history.

(56) References Cited

U.S. PATENT DOCUMENTS 7,174,427 B2 *  2/2007  Ramia ................... H04L 45/00
                                                         711/132
2008/0052270 A1   2/2008  Karlsson
(Continued)

FOREIGN PATENT DOCUMENTS

CN    1487699 A    4/2004
CN    1688134 A    10/2005
(Continued)

OTHER PUBLICATIONS

Steven P Vanderwiel et al:"Data prefetch mechanisms", ACM Computing Surveys, vol. 32, No. 2, Jun. 1, 2000, pp. 174-199, XP058237188.
(Continued)

*Primary Examiner* — Ian N Moore
*Assistant Examiner* — Rushil Parimal Sampat
(74) *Attorney, Agent, or Firm* — Kilpatrick Townsend & Stockton LLP (57) ABSTRACT

A user traffic generation method includes receiving a user traffic generation instruction, performing, in response to the user traffic generation instruction and index information pre-stored in an on-chip static random access memory (SRAM) of a field programmable gate array, a prefetch operation and a cache operation on a user packet that is stored in a dynamic random access memory DRAM and indicated by the index information, and generating user traffic at a line rate of the user packet that is cached during the cache operation. The on-chip SRAM is configured to store index information of all user packets that need to be used. The DRAM is configured to store all the user packets.

18 Claims, 9 Drawing Sheets

(51) Int. Cl.
*H04L 12/26* (2006.01)
*G06F 12/0862* (2016.01)
*H04L 12/861* (2013.01)

(52) U.S. Cl.
CPC .. *H04L 67/2842* (2013.01); *G06F 2212/1021* (2013.01); *G06F 2212/6026* (2013.01); *H04L 49/9042* (2013.01)

(56) References Cited

U.S. PATENT DOCUMENTS

2009/0138661 A1* 5/2009 Lauterbach ......... G06F 9/30047
　　　　　　　　　　　　　　　　　　　　711/137
2014/0321285 A1　 10/2014 Chew et al.

FOREIGN PATENT DOCUMENTS

| CN | 103248540 A | 8/2013 |
|----|-------------|--------|
| CN | 103501209 A | 1/2014 |
| CN | 104168162 A | 11/2014 |
| CN | 104518899 A | 4/2015 |
| CN | 105207953 A | 12/2015 |
| WO | 2005125098 A1 | 12/2005 |

OTHER PUBLICATIONS

Yang Hsin-Jung et al:"Optimizing under abstraction: Using prefetching to improve FPGA performance", 2013 23rd International Conference on Field Programmable Logic and Applications IEEE, Sep. 2, 2013, pp. 1-8, XP032514371.
Ke Zhang,"Design and Research of Network Management Probe Based on Network Processor",dated 2007,p. 51.

* cited by examiner

USER TRAFFIC GENERATION METHOD AND APPARATUS

CROSS-REFERENCE TO RELATED APPLICATIONS

This application is a continuation of International Application No. PCT/CN2016/097245, filed on Aug. 29, 2016, which claims priority to Chinese Patent Application No. 201510644528.7, filed on Sep. 30, 2015. The disclosures of the aforementioned applications are hereby incorporated by reference in their entireties.

TECHNICAL FIELD

The present invention relates to the field of network testing technologies, and specifically, to a user traffic generation method and apparatus.

BACKGROUND

Figure 1:
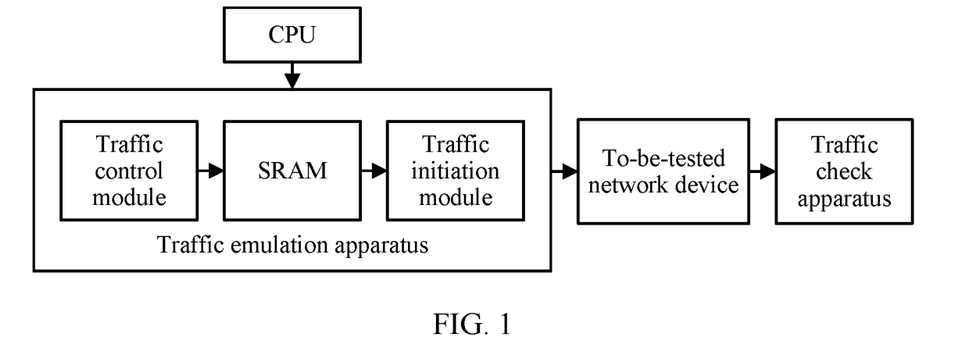
FIG. 1 is a schematic structural diagram of an apparatus for testing forwarding performance of a network device in the prior art.

Currently, forwarding performance of a network device may be tested by a test apparatus shown in FIG. 1. The test apparatus shown in FIG. 1 includes a central processing unit (CPU), a traffic emulation apparatus, a to-be-tested network device, and a traffic check apparatus. The traffic emulation apparatus includes: a traffic control module, configured to control a traffic packet transmission parameter (for example, a packet transmission time, a packet transmission quantity, and a packet transmission interval); a static random access memory (SRAM, Static Random Access Memory), configured to store a user packet; and a traffic initiation module, configured to initiate traffic. A basic principle is as follows: The CPU controls the traffic emulation apparatus to send user traffic; the to-be-tested network device forwards, to the traffic check apparatus, the user traffic sent by the traffic emulation apparatus; the traffic check apparatus performs analysis, check, and statistics collection on the user traffic forwarded by the to-be-tested network device, so as to analyze forwarding performance of the to-be-tested network device. It can be learned that the user traffic sent by the traffic emulation apparatus is very important to a test of the forwarding performance of the network device.

Figure 2:
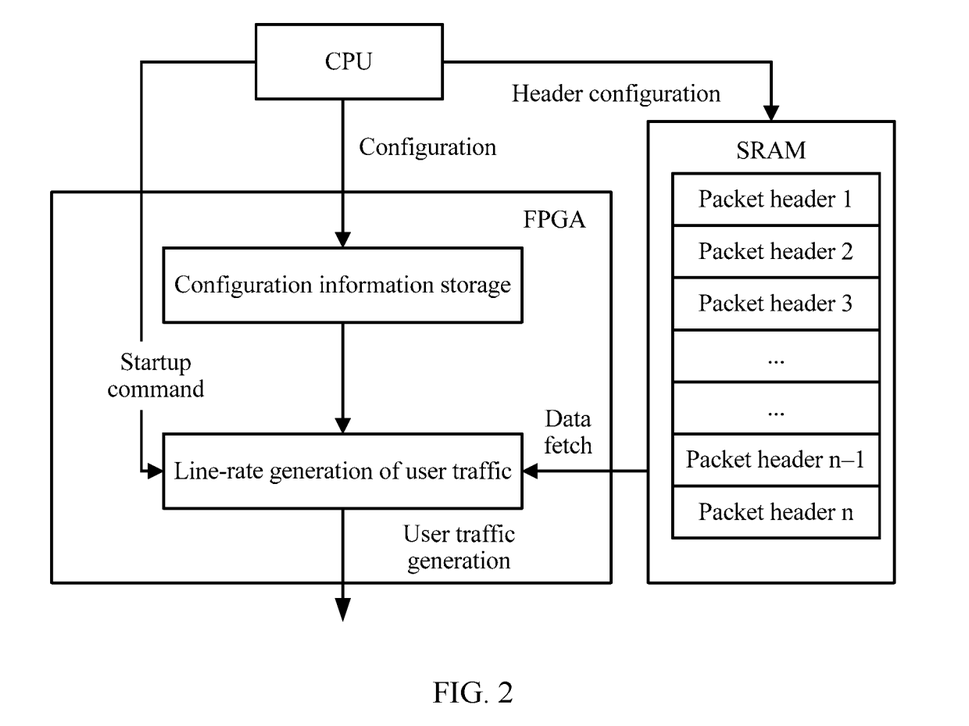
FIG. 2 is a schematic diagram of a user traffic generation principle in the prior art.

In an Ethernet layer-2 test and an Ethernet layer-3 test, the CPU usually controls the traffic emulation apparatus in the test apparatus shown in FIG. 1 to send the user traffic in a generation manner based on field programmable gate array (FPGA, Field Programmable Gate Array) dedicated hardware. A schematic diagram of a principle is shown in FIG. 2. Before the user traffic is generated, the CPU stores configuration information of a user packet into an on-chip SRAM, stores header information of the user packet into a SRAM (an on-chip SRAM or an off-chip SRAM), and cyclically fetches the header information stored in the SRAM in a user traffic generation phase, so as to generate the user traffic. In the generation manner based on FPGA dedicated hardware, generation of ultrafast broadband traffic and precise control of user traffic can be implemented. However, a quantity of user packets is limited by a size of SRAM space. As a result, in the generation manner based on FPGA dedicated hardware, storage of a mass of user packets cannot be implemented, and the user traffic cannot be generated at a line rate.

SUMMARY

Embodiments of the present invention disclose a user traffic generation method and apparatus, to implement storage of a mass of user packets and generate user traffic at a line rate.

A first aspect of the embodiments of the present invention discloses a user traffic generation method, and the method includes:

receiving a user traffic generation instruction;

performing, according to the user traffic generation instruction and index information pre-stored in a first on-chip static random access memory SRAM of a field programmable gate array FPGA, a prefetch operation and a cache operation on a user packet that is stored in a dynamic random access memory DRAM and indicated by the index information, where the first on-chip SRAM is configured to store index information of all user packets that need to be used, and the DRAM is configured to store all the user packets; and generating user traffic according to a user packet that is cached during the cache operation.

With reference to the first aspect of the embodiments of the present invention, in a first possible implementation of the first aspect of the embodiments of the present invention, the method further includes:

grouping all the user packets according to service types, to obtain multiple user packet groups;

grouping each of the user packet groups according to access paths, to obtain multiple user packet subgroups of the user packet group;

successively storing user packets in each user packet subgroup of each user packet group into the DRAM, and generating the index information of all the user packets according to storage locations of all the user packets in the DRAM; and storing the index information of all the user packets into the first on-chip SRAM.

With reference to the first aspect of the embodiments of the present invention or the first possible implementation of the first aspect of the embodiments of the present invention, in a second possible implementation of the first aspect of the embodiments of the present invention, before the generating user traffic according to a user packet that is cached during the cache operation, the method further includes:

determining whether a quantity of user packets cached during the cache operation reaches a preset quantity threshold; and when the quantity of user packets cached during the cache operation reaches the preset quantity threshold, performing the operation of generating user traffic according to a user packet that is cached during the cache operation; or when the quantity of user packets cached during the cache operation does not reach the preset quantity threshold, performing the operation of performing, according to the user traffic generation instruction and index information pre-stored in a first on-chip static random access memory SRAM of a field programmable gate array FPGA, a prefetch operation and a cache operation on a user packet that is stored in a dynamic random access memory DRAM and indicated by the index information, until the quantity of user packets cached during the cache operation reaches the preset quantity threshold.

With reference to the first aspect of the embodiments of the present invention, the first possible implementation of the first aspect of the embodiments of the present invention, or the second possible implementation of the first aspect of the embodiments of the present invention, in a third possible implementation of the first aspect of the embodiments of the present invention, the performing, according to the user traffic generation instruction and index information pre-stored in a first on-chip static random access memory SRAM of a field programmable gate array FPGA, a prefetch operation and a cache operation on a user packet that is stored in a dynamic random access memory DRAM and indicated by the index information includes:

fetching, according to the user traffic generation instruction and the index information pre-stored in the first on-chip SRAM of the FPGA, the user packet that is stored in the DRAM and indicated by the index information, and caching the fetched user packet into a second on-chip SRAM of the FPGA.

With reference to the third possible implementation of the first aspect of the embodiments of the present invention, in a fourth possible implementation of the first aspect of the embodiments of the present invention, before the storing the index information of all the user packets into the first on-chip SRAM, the method further includes:

performing a zero-out operation on the first on-chip SRAM and the second on-chip SRAM.

A second aspect of the embodiments of the present invention discloses a user traffic generation apparatus, and the apparatus includes a communications module, a processing module, and a first generation module, where the communications module is configured to receive a user traffic generation instruction;

the processing module is configured to perform, according to the user traffic generation instruction and index information pre-stored in a first on-chip SRAM of an FPGA, a prefetch operation and a cache operation on a user packet that is stored in a DRAM and indicated by the index information, where the first on-chip SRAM is configured to store index information of all user packets that need to be used, and the DRAM is configured to store all the user packets; and the first generation module is configured to generate user traffic according to a user packet that is cached during the cache operation.

In a first possible implementation of the second aspect of the embodiments of the present invention, the apparatus further includes a grouping module, a storage module, and a second generation module, where the grouping module is configured to: group all the user packets according to service types, to obtain multiple user packet groups, and group each of the user packet groups according to access paths, to obtain multiple user packet subgroups of the user packet group;

the storage module is configured to successively store user packets in each user packet subgroup of each user packet group into the DRAM;

the second generation module is further configured to generate the index information of all the user packets according to storage locations of all the user packets in the DRAM; and the storage module is further configured to store the index information of all the user packets into the first on-chip SRAM.

With reference to the second aspect of the embodiments of the present invention or the first possible implementation of the second aspect of the embodiments of the present invention, in a second possible implementation of the second aspect of the embodiments of the present invention, the apparatus further includes a determining module, where the determining module is configured to: before the first generation module generates the user traffic according to the user packet that is cached during the cache operation, determine whether a quantity of user packets cached during the cache operation reaches a preset quantity threshold; and when the quantity of user packets cached during the cache operation reaches the preset quantity threshold, trigger the first generation module to perform the operation of generating user traffic according to a user packet that is cached during the cache operation; or when the quantity of user packets cached during the cache operation does not reach the preset quantity threshold, trigger the processing module to perform the operation of performing, according to the user traffic generation instruction and index information pre-stored in a first on-chip SRAM of an FPGA, a prefetch operation and a cache operation on a user packet that is stored in a DRAM and indicated by the index information.

With reference to the second aspect of the embodiments of the present invention, the first possible implementation of the second aspect of the embodiments of the present invention, or the second possible implementation of the second aspect of the embodiments of the present invention, in a third possible implementation of the second aspect of the embodiments of the present invention, the processing module further includes a fetch submodule and a cache submodule, where the fetch submodule is configured to fetch, according to the user traffic generation instruction and the index information pre-stored in the first on-chip SRAM, the user packet that is stored in the DRAM and indicated by the index information; and the cache submodule is configured to cache the user packet fetched by the fetch submodule into a second on-chip SRAM.

With reference to the third possible implementation of the second aspect of the embodiments of the present invention, in a fourth possible implementation of the second aspect of the embodiments of the present invention, the apparatus further includes a zero-out module, where the zero-out module is configured to perform a zero-out operation on the first on-chip SRAM and the second on-chip SRAM before the cache submodule caches the user packet fetched by the fetch submodule into the second on-chip SRAM.

In the embodiments of the present invention, the user traffic generation instruction is received; the prefetch operation and the cache operation are performed, according to the user traffic generation instruction and the index information pre-stored in the first on-chip static random access memory SRAM of the field programmable gate array FPGA, on the user packet that is stored in the dynamic random access memory DRAM and indicated by the index information, where the first on-chip SRAM is configured to store the index information of all the user packets that need to be used, and the DRAM is configured to store all the user packets; and the user traffic is generated according to the user packet that is cached during the cache operation. It can be learned that: according to the embodiments of the present invention, storage of a mass of user packets can be implemented by using a DRAM, and user traffic can be generated at a line rate by performing a prefetch operation and a cache operation on a stored user packet.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose a user traffic generation method and apparatus. Therefore, storage of a mass of user packets can be implemented by using a dynamic random access memory (DRAM, Dynamic Random Access Memory), and user traffic can be generated at a line rate by performing a prefetch operation and a cache operation on a stored user packet. Details are separately illustrated in the following.

Figure 3:
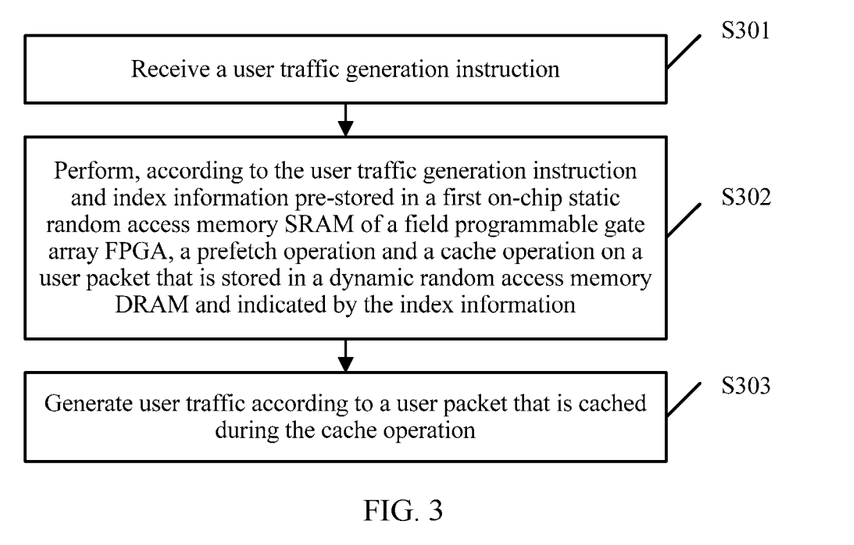
FIG. 3 is a schematic flowchart of a user traffic generation method according to an embodiment of the present invention.

Referring to FIG. 3, FIG. 3 is a schematic flowchart of a user traffic generation method according to an embodiment of the present invention. As shown in FIG. 3, the user traffic generation method may include the following steps.

S301. Receive a user traffic generation instruction.

In this embodiment of the present invention, the user traffic generation instruction is used for enabling user traffic generation. In addition, the user traffic generation instruction may be manually entered by a tester, or may be generated by a CPU. This embodiment of the present invention sets no limitation thereto.

S302. Perform, according to the user traffic generation instruction and index information pre-stored in a first on-chip static random access memory SRAM of a field programmable gate array FPGA, a prefetch operation and a cache operation on a user packet that is stored in a dynamic random access memory DRAM and indicated by the index information.

In this embodiment of the present invention, the first on-chip SRAM of the FPGA is configured to store index information of all user packets that need to be used, and the DRAM is configured to store all the user packets that need to be used. Optionally, the DRAM may be specifically configured to store all the user packets in a group storage form. That is, all the user packets are grouped according to a preset condition, and the grouped user packets are sequentially stored into the DRAM. Because the DRAM has an advantage of large storage space to store user packets of thousands of users, the DRAM stores all the user packets that need to be used, so as to implement storage of a mass of user packets, ensure a scale of analog users, and save hardware costs.

In this embodiment of the present invention, the prefetch operation and the cache operation are performed on the user packet that is in a user packet group stored in the DRAM and indicated by the index information pre-stored in the first on-chip SRAM. Therefore, a problem that access bandwidth of the DRAM is uncertain can be resolved, and a user packet can be effectively fetched from the DRAM in a fixed cycle. This ensures that user traffic can be generated at a line rate.

S303. Generate user traffic according to a user packet that is cached during the cache operation.

In this embodiment of the present invention, the generating user traffic according to a user packet that is cached during the cache operation may include:

generating the user traffic according to a user traffic generation parameter and the user packet cached during the cache operation, where the user traffic generation parameter may include a packet transmission mode, a packet transmission quantity, user bandwidth, and the like, and is not limited in this embodiment of the present invention.

In an optional implementation, before step S301 is performed, the following operations may be further performed:

grouping all the user packets according to service types, to obtain multiple user packet groups;

grouping each of the user packet groups according to access paths, to obtain multiple user packet subgroups of the user packet group;

successively storing user packets in each user packet subgroup of each user packet group into the DRAM, and generating the index information of each of all the user packets according to a storage location of each of all the user packets in the DRAM; and storing the index information of all the user packets into the first on-chip SRAM.

Figure 6:
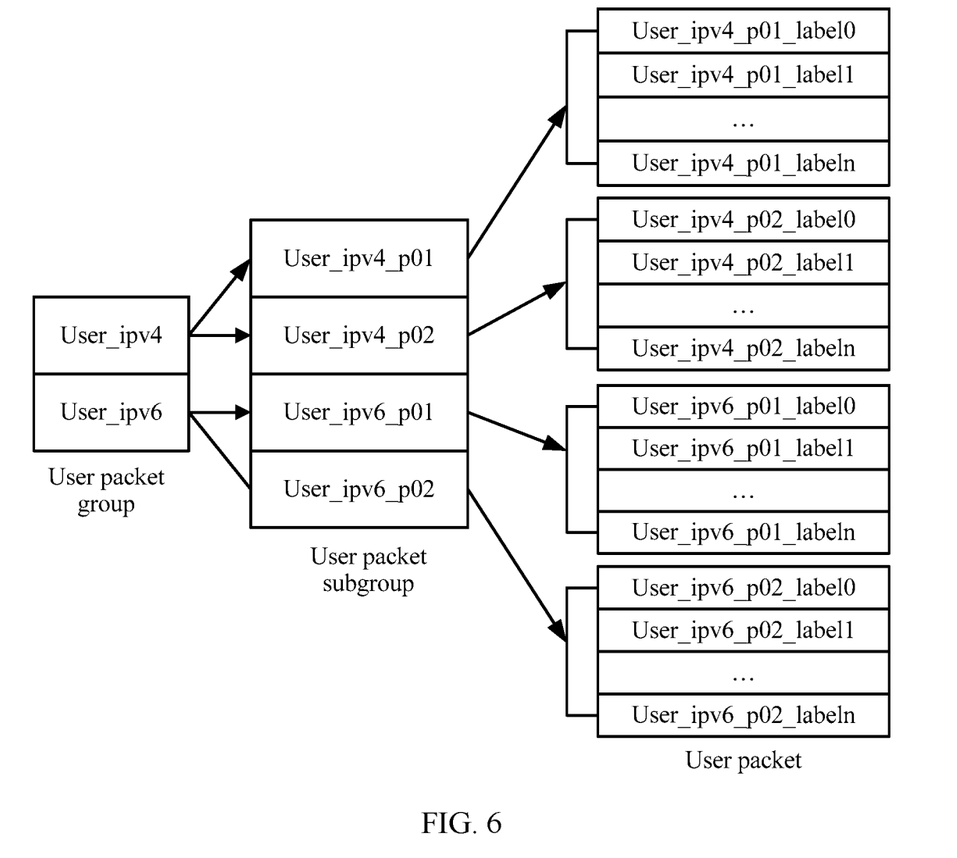
FIG. 6 is a schematic diagram of user packet grouping according to an embodiment of the present invention.

In the optional implementation, the user packets are grouped, and are successively configured into the DRAM according to a grouping order. The index information (that is, information about the storage location) of the user packets in the DRAM is configured into the first on-chip SRAM to facilitate user packet scheduling. In addition, specifically, the CPU may perform a grouping operation to obtain user packet groups, a grouping operation to obtain user packet subgroups, a storage operation on each user packet, a generation operation and a storage operation on index information of each user packet, and the like. This embodiment of the present invention sets no limitation thereto. For example, it is assumed that service types include an IPv4 service type and an IPv6 service type. Two user packet groups: User_ipv4 and User_ipv6 may be obtained according to the service types. Access paths include p01 and p02. According to the access paths, the user packet group User_ipv4 is divided into two user packet subgroups: User_ipv4_p01 and User_ipv4_p02, and the user packet group User_ipv6 is divided into two user packet subgroups: User_ipv6_p01 and User_ipv6_p02. Each user packet carries a related attribute such as a label. User packets in the user packet subgroup User_ipv4_p01 of the user packet group User_ipv4 include User_ipv4_p01_label0, User_ipv4_p01_label1, . . . , User_ipv4_p01_labeln-1, and User_ipv4_p01_labeln. User packets in the user packet subgroup User_ipv4_p02 of the user packet group User_ipv4 include User_ipv4_p02_label0, User_ipv4_p02_label1, . . . , User_ipv4_p02_labeln-1, and User_ipv4_p02_labeln. User packets in the user packet subgroup User_ipv6_p01 of the user packet group User_ipv6 include User_ipv6_p01_label0, User_ipv6_p01_label1, . . . , User_ipv6_p01_labeln-1, and User_ipv6_p01_labeln. User packets in the user packet subgroup User_ipv6_p02 of the user packet group User_ipv6 include User_ipv6_p02_label0, User_ipv6_p02_label1, . . . , User_ipv6_p02_labeln-1, and User_ipv6_p02_labeln. For details, refer to FIG. 6. FIG. 6 is a schematic diagram of user packet grouping according to an embodiment of the present invention.

In another optional implementation, after step S302 is performed, the following operations may be further performed before step S303 is performed:

determining whether a quantity of user packets cached during the cache operation reaches a preset quantity threshold (or a specific waterline); and when the quantity of user packets cached during the cache operation reaches the preset quantity threshold, triggering performing of step S303; or when the quantity of user packets cached during the cache operation does not reach the preset quantity threshold, continuing to perform step S302 until the quantity of user packets cached during the cache operation reaches the preset quantity threshold, where each time step S303 is performed, a user packet cached during the cache operation is different from a user packet cached during the former cache operation, and the user packet cached during the cache operation in step S303 is a sum of user packets cached during the cache operation in step S302 before step S303.

In the another optional implementation, a feedback signal is generated when the quantity of user packets cached during the cache operation reaches the specific waterline, and the user traffic is generated according to the feedback signal and the user packet cached during the cache operation, so as to ensure stability of user traffic generation.

In still another optional implementation, the performing, according to the user traffic generation instruction and index information pre-stored in a first on-chip static random access memory SRAM of a field programmable gate array FPGA, a prefetch operation and a cache operation on a user packet that is stored in a dynamic random access memory DRAM and indicated by the index information may include:

fetching, according to the user traffic generation instruction and the index information pre-stored in the first on-chip SRAM of the FPGA, the user packet that is stored in the DRAM and indicated by the index information, and caching the fetched user packet into a second on-chip SRAM.

In still another optional implementation, before step S301 is performed, the following operations may be further performed:

performing an initialization operation.

Specifically, in the still another optional implementation, the CPU may perform an initialization operation on a user traffic generation mechanism (for example, a prefetch operation and a cache operation) that is required in this embodiment of the present invention, and perform a zero-out operation on the first on-chip SRAM and the second on-chip SRAM, so as to ensure accuracy of user traffic generation.

In this embodiment of the present invention, the user traffic generation instruction is received; the prefetch operation and the cache operation are performed, according to the user traffic generation instruction and the index information pre-stored in the first on-chip static random access memory SRAM of the field programmable gate array FPGA, on the user packet that is stored in the dynamic random access memory DRAM and indicated by the index information, where the first on-chip SRAM is configured to store the index information of all the user packets that need to be used, and the DRAM is configured to store all the user packets; and the user traffic is generated according to the user packet that is cached during the cache operation. It can be learned that: according to this embodiment of the present invention, storage of a mass of user packets can be implemented by using a DRAM, and user traffic can be generated at a line rate by performing a prefetch operation and a cache operation on a stored user packet.

Figure 4:
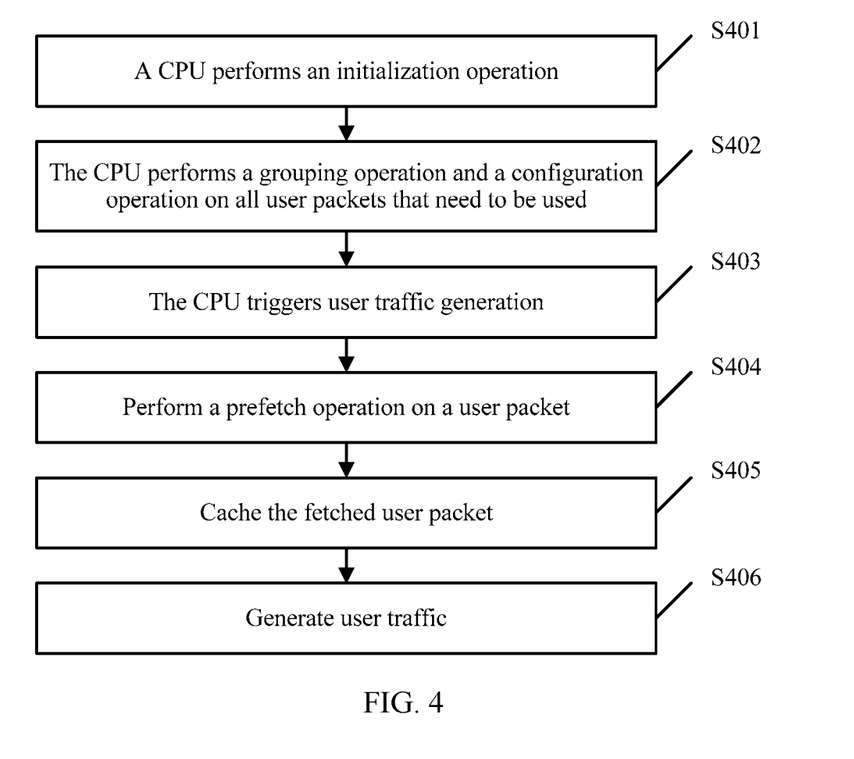
FIG. 4 is a schematic flowchart of another user traffic generation method according to an embodiment of the present invention.

Referring to FIG. 4, FIG. 4 is a schematic flowchart of another user traffic generation method according to an embodiment of the present invention. The user traffic generation method in FIG. 4 is applicable to an architecture including a CPU, an FPGA, and a DRAM. The FPGA includes a first on-chip SRAM and a second on-chip SRAM. As shown in FIG. 4, the user traffic generation method may include the following steps.

S401. The CPU performs an initialization operation.

In this embodiment of the present invention, specifically, that the CPU performs an initialization operation may include:

the CPU performs an initialization operation on a user traffic generation mechanism (for example, a prefetch operation and a cache operation for a user packet) in this embodiment of the present invention, and performs a zero-out operation on the first on-chip SRAM and the second on-chip SRAM of the FPGA.

S402. The CPU performs a grouping operation and a configuration operation on all user packets that need to be used.

In this embodiment of the present invention, specifically, that the CPU performs a grouping operation and a configuration operation on all user packets that need to be used may include:

the CPU groups all the user packets according to service types, to obtain multiple user packet groups;

the CPU groups each of the user packet groups according to access paths, to obtain user packet subgroups of each user packet group;

the CPU successively stores user packets in each user packet subgroup of each user packet group into the DRAM;

the CPU obtains location information of each user packet in each user packet subgroup of each user packet group, and generates index information; and the CPU configures the index information of each user packet into the first on-chip SRAM of the FPGA.

S403. The CPU triggers user traffic generation.

In this embodiment of the present invention, that the CPU triggers user traffic generation may include:

the CPU generates a user traffic generation instruction.

S404. Perform a prefetch operation on a user packet.

In this embodiment of the present invention, the performing a prefetch operation on a user packet may include:

successively fetching the user packets from the DRAM according to the index information stored in the first on-chip SRAM.

S405. Cache the fetched user packet.

In this embodiment of the present invention, the caching the fetched user packet may include:

caching the user packet fetched in step S404 into the second on-chip SRAM of the FPGA; and when a quantity of user packets cached in step S405 reaches a preset quantity threshold (a specific waterline), generating a first feedback signal to trigger performing of step S406, and generating a second feedback signal to suspend performing of step S404; or when a quantity of user packets cached in step S405 does not reach a preset quantity threshold, continuing to perform step S404, so that overflow of the user packets cached in the second on-chip SRAM can be avoided, and stability of user packet generation can also be ensured.

S406. Generate user traffic.

In this embodiment of the present invention, the generating user traffic may include:

fetching, according to the user traffic generation instruction and the first feedback signal, the user packet cached in step S405, and generating the user traffic according to the fetched user packet.

It can be learned that: according to this embodiment of the present invention, storage of a mass of user packets can be implemented, user traffic can be generated at a line rate, and stability of user traffic generation can be ensured.

Figure 5:
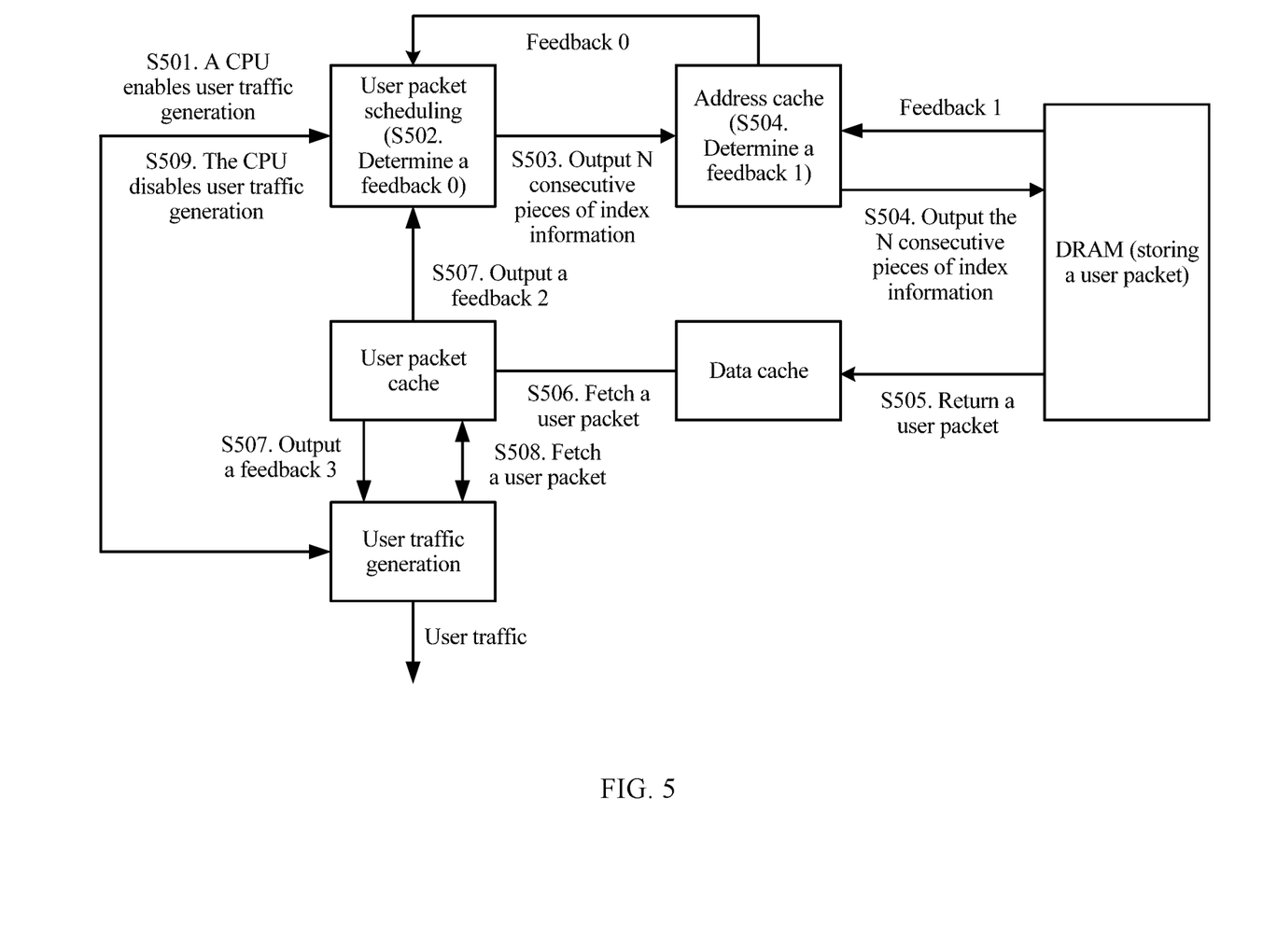
FIG. 5 is a schematic flowchart of still another user traffic generation method according to an embodiment of the present invention.

Referring to FIG. 5, FIG. 5 is a schematic flowchart of still another user traffic generation method according to an embodiment of the present invention. As shown in FIG. 5, the user traffic generation method may include the following steps.

S501. A CPU enables user traffic generation.

S502. Determine whether a quantity of pieces of index information of cached user packets (or a feedback 0) exceeds a first preset quantity threshold; and if the quantity of pieces of index information of cached user packets does not exceed the first preset quantity threshold, enable continuous scheduling of user packets for one time, where the index information of the cached user packets is index information of user packets that is successively fetched from a first on-chip SRAM that stores index information of all user packets.

S503. After the continuous scheduling of user packets is enabled, successively parse index information of N user packets, output the parsed index information of the N user packets, and cache the parsed index information of the N user packets into an address cache, where a quantity of cached user packets (or a feedback 2) in step S507 needs to be determined each time continuous scheduling of N user packets is completed; and if cache space permits, perform continuous scheduling of user packets for a next time; or if cache space does not permit, suspend the continuous scheduling of user packets.

S504. Determine, according to a feedback 1, whether a DRAM can be accessed, and if the DRAM can be accessed, output the index information cached in the address cache to access the DRAM.

S505. Cache a user packet fetched from the DRAM into a data cache.

S506. Determine a status of the data cache; and if the data cache caches a user packet, immediately fetch the user packet, and cache the user packet into a user packet cache.

S507. Determine whether the quantity of user packets cached in the user packet cache reaches a second preset quantity threshold; if the quantity of user packets cached in the user packet cache reaches the second preset quantity threshold, output the feedback 2 that is used for suspending the continuous scheduling of user packets, and determine whether the quantity of user packets cached in the user packet cache reaches a third preset quantity threshold; and if the quantity of user packets cached in the user packet cache reaches the third preset quantity threshold, output a feedback 3 that is used for enabling user traffic generation, where the feedback 2 is output to avoid space overflow in the user packet cache.

It should be noted that: the feedback 2 is continuously output before the CPU disables user traffic generation, and the feedback 3 is output for one time only after the CPU enables user traffic generation and when the quantity of user packets cached in the user packet cache reaches the third preset quantity threshold.

S508. Fetch a user packet in the user packet cache, and generate user traffic.

S509. The CPU disables user traffic generation.

Figure 7:
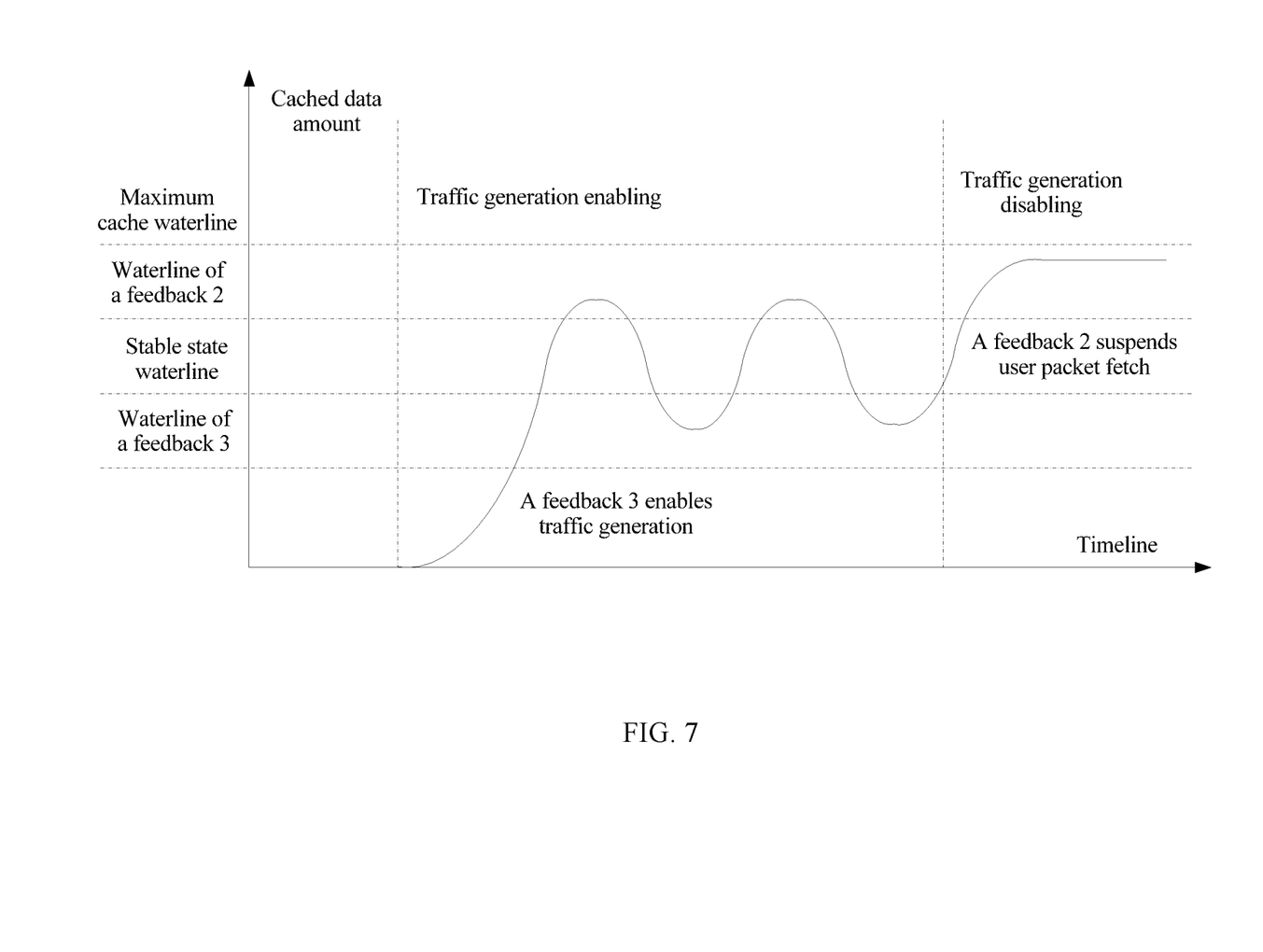
FIG. 7 is a diagram of a correspondence between a time and a quantity of user packets cached in a user packet cache according to an embodiment of the present invention.

In this embodiment of the present invention, a correspondence between a time and the quantity of user packets cached in the user packet cache may be shown in FIG. 7. FIG. 7 is a diagram of a correspondence between a time and a quantity of user packets cached in a user packet cache according to an embodiment of the present invention. As shown in FIG. 7, before the CPU enables user traffic generation, the quantity of user packets cached in the user packet cache is 0. After the CPU enables user traffic generation, the quantity of user packets cached in the user packet cache gradually increases to the third preset quantity threshold (that is, a waterline of the feedback 3). The user traffic generation starts when the quantity gradually increases to the third preset quantity threshold (that is, the waterline of the feedback 3). Before the quantity reaches a waterline of the feedback 2 on which the continuous scheduling of user packets needs to be suspended, the quantity of user packets cached in the user packet cache fluctuates around a stable state waterline and the waterline of the feedback 2. When the user traffic generation is disabled, the quantity of user packets cached in the user packet cache always falls within the waterline of the feedback 2 and a maximum cache waterline.

It can be learned that: according to this embodiment of the present invention, storage of a mass of user packets can be implemented, user traffic can be generated at a line rate, and stability of user traffic generation can be ensured.

Figure 8:
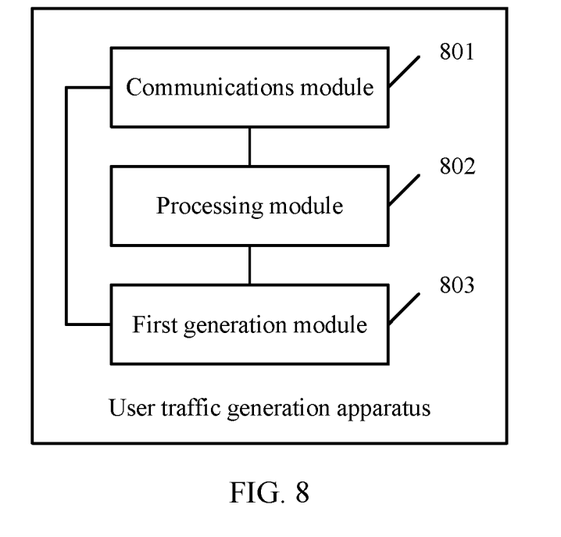
FIG. 8 is a schematic structural diagram of a user traffic generation apparatus according to an embodiment of the present invention.

Referring to FIG. 8, FIG. 8 is a schematic structural diagram of a user traffic generation apparatus according to an embodiment of the present invention. As shown in FIG. 8, the user traffic generation apparatus may include a communications module 801, a processing module 802, and a first generation module 803.

The communications module 801 is configured to receive a user traffic generation instruction.

In this embodiment of the present invention, the user traffic generation instruction is used for enabling user traffic generation. In addition, the user traffic generation instruction may be manually entered by a tester, or may be generated by a CPU. This embodiment of the present invention sets no limitation thereto.

The processing module 802 is configured to perform, according to the user traffic generation instruction received by the communications module 801 and index information pre-stored in a first on-chip SRAM of an FPGA, a prefetch operation and a cache operation on a user packet that is stored in a DRAM and indicated by the index information.

In this embodiment of the present invention, the first on-chip SRAM of the FPGA is configured to store index information of all user packets that need to be used, and the DRAM is configured to store all the user packets that need to be used. Optionally, the DRAM may be specifically configured to store all the user packets in a group storage form. That is, all the user packets are grouped according to a preset condition, and the grouped user packets are sequentially stored into the DRAM. Because the DRAM has an advantage of large storage space to store user packets of thousands of users, the DRAM stores all the user packets that need to be used, so as to implement storage of a mass of user packets, ensure a scale of analog users, and save hardware costs.

The first generation module 803 is configured to generate user traffic according to the user traffic generation instruction and the user packet that is cached when the processing module 802 performs the cache operation.

Figure 9:
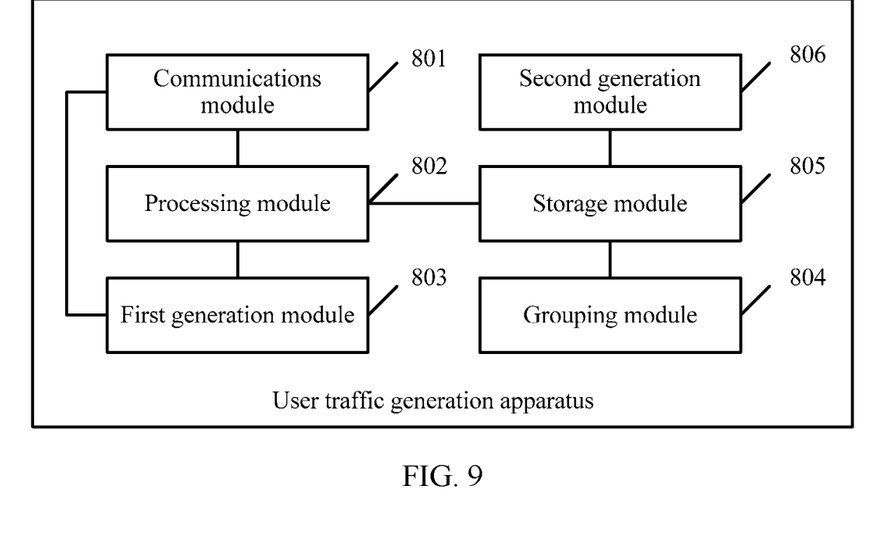
FIG. 9 is a schematic structural diagram of another user traffic generation apparatus according to an embodiment of the present invention.

In an optional implementation, based on a structure of the apparatus shown in FIG. 8, the user traffic generation apparatus may further include a grouping module 804, a storage module 805, and a second generation module 806. In this case, a structure of the user traffic generation apparatus may be shown in FIG. 9. FIG. 9 is a schematic structural diagram of another user traffic generation apparatus according to an embodiment of the present invention.

The grouping module 804 is configured to: group all the user packets according to service types, to obtain multiple user packet groups, and group each of the user packet groups according to access paths, to obtain multiple user packet subgroups of the user packet group.

The storage module 805 is configured to successively store user packets in each user packet subgroup of each user packet group into the DRAM.

The second generation module 806 is configured to generate the index information of each of all the user packets according to storage locations of all the user packets in the DRAM.

The storage module 805 may be further configured to store the index information of all the user packets into the first on-chip SRAM.

Figure 10:
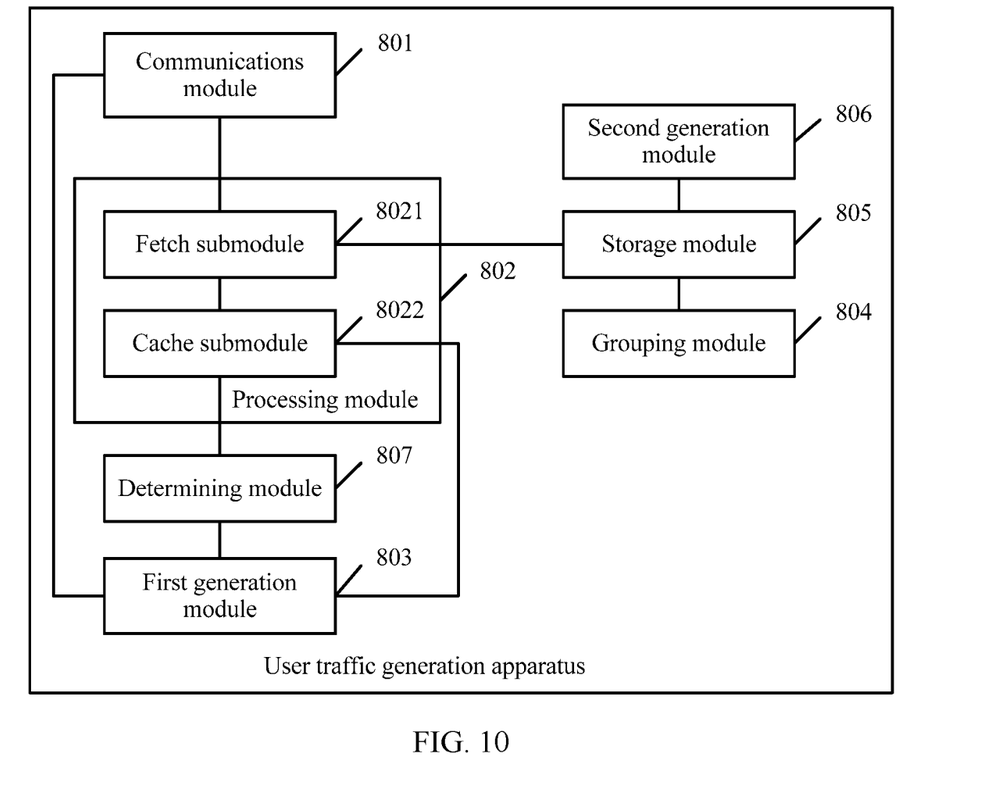
FIG. 10 is a schematic structural diagram of still another user traffic generation apparatus according to an embodiment of the present invention.

In another optional implementation, based on the structure of the apparatus shown in FIG. 9, the user traffic generation apparatus may further include a determining module 807. In this case, a structure of the user traffic generation apparatus may be shown in FIG. 10. FIG. 10 is a schematic structural diagram of still another user traffic generation apparatus according to an embodiment of the present invention.

The determining module 807 is configured to: before the first generation module 803 generates the user traffic according to the user packet that is cached when the processing module 802 performs the cache operation, determine whether a quantity of user packets cached when the processing module 802 performs the cache operation reaches a preset quantity threshold; and when the quantity of user packets cached when the processing module 802 performs the cache operation reaches the preset quantity threshold, trigger the first generation module 803 to perform the operation of generating user traffic according to a user packet that is cached when the processing module 802 performs the cache operation; or when the quantity of user packets cached when the processing module 802 performs the cache operation does not reach the preset quantity threshold, trigger the processing module 802 to continue to perform the operation of performing, according to the user traffic generation instruction received by the communications module 801 and index information pre-stored in a first on-chip SRAM of an FPGA, a prefetch operation and a cache operation on a user packet that is stored in a DRAM and indicated by the index information.

Specifically, when the determining module 807 determines that the quantity of user packets cached when the processing module 802 performs the cache operation reaches the preset quantity threshold, a feedback signal is generated, and the feedback signal is sent to the first generation module 803, to trigger the first generation module 803 to generate the user traffic according to the user packet cached during the cache operation.

Further, optionally, as shown in FIG. 10, the processing module 802 may include a fetch submodule 8021 and a cache submodule 8022.

The fetch submodule 8021 is configured to fetch, according to the user traffic generation instruction received by the communications module 801 and the index information pre-stored in the first on-chip SRAM, the user packet that is stored in the DRAM and indicated by the index information.

The cache submodule 8022 is configured to cache the user packet fetched by the fetch submodule 8021 into a second on-chip SRAM.

Figure 11:
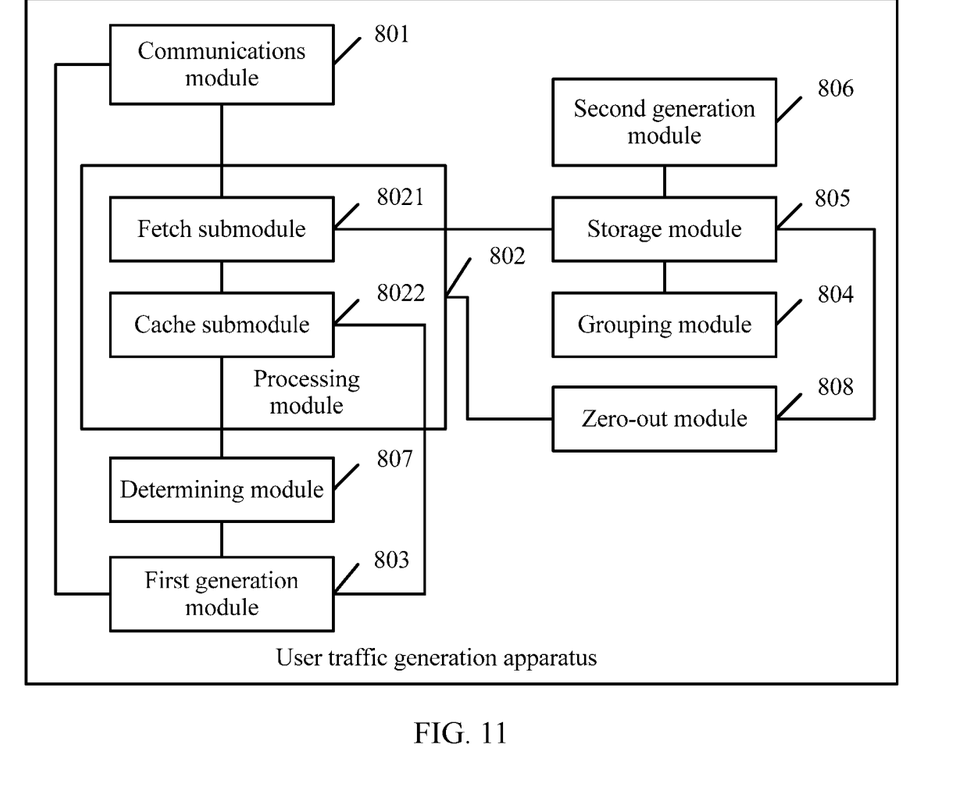
FIG. 11 is a schematic structural diagram of still another user traffic generation apparatus according to an embodiment of the present invention.

In another optional implementation, based on the structure of the apparatus shown in FIG. 10, the user traffic generation apparatus may further include a zero-out module 808. In this case, a structure of the user traffic generation apparatus may be shown in FIG. 11. FIG. 11 is a schematic structural diagram of still another user traffic generation apparatus according to an embodiment of the present invention.

The zero-out module 808 is configured to: perform an initialization operation on a user traffic generation mechanism (for example, a prefetch operation and a cache operation) that is required in this embodiment of the present invention, and perform a zero-out operation on the first on-chip SRAM and the second on-chip SRAM, so as to ensure accuracy of user traffic generation.

It can be learned that: according to this embodiment of the present invention, storage of a mass of user packets can be implemented, user traffic can be generated at a line rate, and stability and accuracy of user traffic generation can be ensured.

Figure 12:
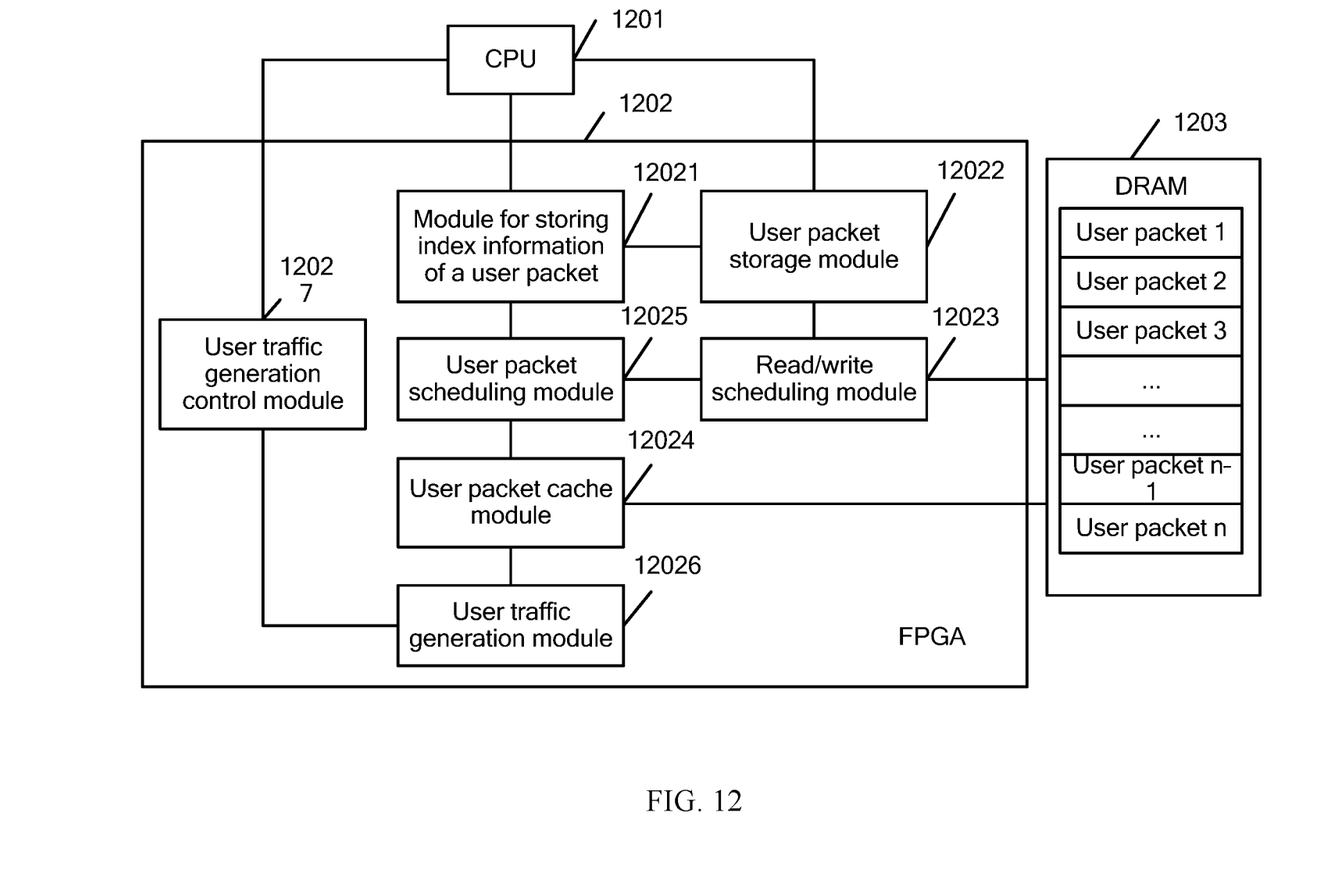
FIG. 12 is a schematic structural diagram of still another user traffic generation apparatus according to an embodiment of the present invention.

Referring to FIG. 12, FIG. 12 is a schematic structural diagram of still another user traffic generation apparatus according to an embodiment of the present invention. As shown in FIG. 12, the user traffic generation apparatus may include a CPU 1201, an FPGA 1202, and a DRAM 1203. The FPGA 1202 may include a module 12021 for storing index information of a user packet, a user packet storage module 12022, a read/write scheduling module 12023, a user packet cache module 12024, a user packet scheduling module 12025, a user traffic generation module 12026, and a user traffic generation control module 12027. A working principle of the user traffic generation apparatus shown in FIG. 12 is as follows:

Before enabling user traffic generation, the CPU 1201 performs an initialization operation on the FPGA 1202, and groups a mass of user packets. The user packet storage module 12022 uses the read/write scheduling module 12023 to successively write the grouped user packets into the DRAM 1203. The module 12021 for storing index information of a user packet stores index information of a user packet in the DRAM 1203. The CPU 1201 enables user traffic generation. The user packet scheduling module 12025 fetches a specific quantity of consecutive pieces of index information from the module 12021 for storing index information of a user packet. The read/write scheduling module 12023 accesses the DRAM 1203 according to the specific quantity of consecutive pieces of index information. The DRAM 1203 outputs a user packet indicated by the specific quantity of consecutive pieces of index information. The user packet cache module 12024 is configured to: cache the user packet output by the DRAM 1203, and output first status feedback information and second status feedback information according to a quantity of cached user packets. When the quantity of cached user packets reaches a specific waterline, the first status feedback information is used to instruct the user packet scheduling module 12025 to suspend working, and the second status feedback information is used to instruct the user traffic generation control module 12027 to control the user traffic generation module 12026 according to a control parameter (for example, a packet transmission mode, a packet transmission quantity, and user bandwidth) to fetch the user packet cached in the user packet cache module 12024 and generate user traffic.

It should be noted that the module 12021 for storing index information of a user packet may be a SRAM of the FPGA 1202, the user packet cache module 12024 may be another SRAM of the FPGA 1202, and modules of the FPGA 1202 may be combined, deleted, or split according to an actual need. This embodiment of the present invention sets no limitation thereto.

It can be learned that: according to this embodiment of the present invention, storage of a mass of user packets can be implemented, user traffic can be generated at a line rate, and stability and accuracy of user traffic generation can be ensured.

It should be noted that, in the foregoing embodiments, the description of each embodiment has respective focuses. For a part that is not described in detail in an embodiment, refer to related descriptions in other embodiments. In addition, a person skilled in the art should also appreciate that all the embodiments described in the specification are preferred embodiments, and the related actions, modules, and submodules are not necessarily mandatory to the present invention.

A sequence of the steps of the method in the embodiments of the present invention may be adjusted, and certain steps may also be merged or removed according to an actual need.

Merging, division, and removing may be performed on the modules and submodules of the apparatus in the embodiments of the present invention according to an actual need.

The modules of the embodiments of the present invention may be executed by a universal integrated circuit, such as a CPU (Central Processing Unit) or an ASIC (Application Specific Integrated Circuit, application-specific integrated circuit).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The user traffic generation method and apparatus provided in the embodiments of the present invention are described in detail above. Specific examples are used in the specification to illustrate the principle and implementations of the present invention. The foregoing embodiments are described merely for ease of understanding of the method and core ideas of the present invention. In addition, for a person of ordinary skill in the art, on the basis of the idea of the present invention, a modification may be made to the specific implementation and the application range. In conclusion, the content of the specification shall not be construed as a limit to the present invention.

What is claimed is:

1. A user traffic generation method, wherein the method comprises:
   receiving a user traffic generation instruction;
   performing, according to the user traffic generation instruction and index information pre-stored in a first on-chip static random access memory (SRAM) of a field programmable gate array (FPGA), a prefetch operation and a cache operation on a user packet that is stored in a dynamic random access memory (DRAM), and indicated by the index information, wherein the first on-chip SRAM is configured to store index information of all user packets that need to be used, and the DRAM is configured to store all the user packets;
   generating user traffic according to a user packet that is cached during the cache operation;
   grouping all the user packets according to service types to obtain a plurality of user packet groups;
   grouping each of the user packet groups according to access paths to obtain a plurality of user packet subgroups of each user packet group;
   successively storing user packets in each user packet subgroup of each user packet group into the DRAM, and generating the index information of all the user packets according to storage locations of all the user packets in the DRAM; and
   storing the index information of all the user packets into the first on-chip SRAM.

2. The method according to claim 1, further comprising, prior to generating user traffic:
   determining whether a quantity of user packets cached during the cache operation reaches a preset quantity threshold; and
   when the quantity of user packets cached during the cache operation reaches the preset quantity threshold, generating the user traffic and
   when the quantity of user packets cached during the cache operation does not reach the preset quantity threshold, continuously fetching a next user packet stored in the DRAM and caching the fetched next user packet until the quantity of user packets cached during the cache operation reaches the preset quantity threshold.

3. The method according to claim 1, further comprising, prior to generating user traffic:
   determining whether a quantity of user packets cached during the cache operation reaches a preset quantity threshold; and
   when the quantity of user packets cached during the cache operation reaches the preset quantity threshold, generating the user traffic and
   when the quantity of user packets cached during the cache operation does not reach the preset quantity threshold, continuously fetching a next user packet stored in the DRAM and caching the fetched next user packet until the quantity of user packets cached during the cache operation reaches the preset quantity threshold.

4. The method according to claim 1, wherein performing the prefetch operation and the cache operation comprises:
   fetching, according to the user traffic generation instruction and the index information pre-stored in the first on-chip SRAM of the FPGA, the user packet that is stored in the DRAM and indicated by the index information, and caching the fetched user packet into a second on-chip SRAM of the FPGA.

5. The method according to claim 1, wherein performing the prefetch operation and the cache operation comprises:
fetching, according to the user traffic generation instruction and the index information pre-stored in the first on-chip SRAM of the FPGA, the user packet that is stored in the DRAM and indicated by the index information, and caching the fetched user packet into a second on-chip SRAM of the FPGA.

6. The method according to claim 2, wherein performing the prefetch operation and the cache operation comprises:
fetching, according to the user traffic generation instruction and the index information pre-stored in the first on-chip SRAM of the FPGA, the user packet that is stored in the DRAM and indicated by the index information, and caching the fetched user packet into a second on-chip SRAM of the FPGA.

7. The method according to claim 3, wherein performing the prefetch operation and the cache operation on a user packet that is stored in a dynamic random access memory DRAM and indicated by the index information comprises:
fetching, according to the user traffic generation instruction and the index information pre-stored in the first on-chip SRAM of the FPGA, the user packet that is stored in the DRAM and indicated by the index information, and caching the fetched user packet into a second on-chip SRAM of the FPGA.

8. The method according to claim 4, further comprising, prior to storing the index information of all the user packets into the first on-chip SRAM:
performing a zero-out operation on the first on-chip SRAM and the second on-chip SRAM.

9. The method according to claim 5, further comprising, prior to storing the index information of all the user packets into the first on-chip SRAM:
performing a zero-out operation on the first on-chip SRAM and the second on-chip SRAM.

10. A user traffic generation apparatus comprising a communications module, a processing module, a grouping module, a storage module, a first generation module, and a second generation module, wherein
the communications module is configured to receive a user traffic generation instruction;
the processing module is configured to perform, according to the user traffic generation instruction and index information pre-stored in a first on-chip static random access memory (SRAM) of an field programmable gate array (FPGA), a prefetch operation and a cache operation on a user packet that is stored in a dynamic random access memory (DRAM) and indicated by the index information, wherein the first on-chip SRAM is configured to store index information of all user packets that need to be used, and the DRAM is configured to store all the user packets;
the first generation module is configured to generate user traffic according to a user packet that is cached during the cache operation;
the grouping module is configured to group all the user packets according to service types to obtain a plurality of user packet groups, and group each of the user packet groups according to access paths to obtain a plurality of user packet subgroups of each user packet group;

the second generation module is configured to generate the index information of all the user packets according to storage locations of all the user packets in the DRAM; and
the storage module is configured to successively store user packets in each user packet subgroup of each user packet group into the DRAM and store the index information of all the user packets into the first on-chip SRAM.

11. The apparatus according to claim 10, further comprising a determining module configured to: before the first generation module generates the user traffic according to the user packet that is cached during the cache operation, determine whether a quantity of user packets cached during the cache operation reaches a preset quantity threshold; and
when the quantity of user packets cached during the cache operation reaches the preset quantity threshold, trigger the first generation module to perform the operation of generating the user traffic and
when the quantity of user packets cached during the cache operation does not reach the preset quantity threshold, trigger the processing module to continuously fetch a next user packet stored in the DRAM and cache the fetched next user packet until the quantity of user packets cached during the cache operation reaches the preset quantity threshold.

12. The apparatus according to claim 10, further comprising a determining module configured to: before the first generation module generates the user traffic according to the user packet that is cached during the cache operation, determine whether a quantity of user packets cached during the cache operation reaches a preset quantity threshold; and
when the quantity of user packets cached during the cache operation reaches the preset quantity threshold, trigger the first generation module to perform the operation of generating the user traffic and
when the quantity of user packets cached during the cache operation does not reach the preset quantity threshold, trigger the processing module to continuously fetch a next user packet stored in the DRAM and cache the fetched next user packet until the quantity of user packets cached during the cache operation reaches the preset quantity threshold.

13. The apparatus according to claim 10, wherein the processing module comprises a fetch submodule and a cache submodule, wherein
the fetch submodule is configured to fetch, according to the user traffic generation instruction and the index information pre-stored in the first on-chip SRAM, the user packet that is stored in the DRAM and indicated by the index information; and
the cache submodule is configured to cache the user packet fetched by the fetch submodule into a second on-chip SRAM.

14. The apparatus according to claim 10, wherein the processing module comprises a fetch submodule and a cache submodule, wherein
the fetch submodule is configured to fetch, according to the user traffic generation instruction and the index information pre-stored in the first on-chip SRAM, the user packet that is stored in the DRAM and indicated by the index information; and
the cache submodule is configured to cache the user packet fetched by the fetch submodule into a second on-chip SRAM.

15. The apparatus according to claim 11, wherein the processing module comprises a fetch submodule and a cache submodule, wherein
- the fetch submodule is configured to fetch, according to the user traffic generation instruction and the index information pre-stored in the first on-chip SRAM, the user packet that is stored in the DRAM and indicated by the index information; and
- the cache submodule is configured to cache the user packet fetched by the fetch submodule into a second on-chip SRAM.

16. The apparatus according to claim 12, wherein the processing module comprises a fetch submodule and a cache submodule, wherein
- the fetch submodule is configured to fetch, according to the user traffic generation instruction and the index information pre-stored in the first on-chip SRAM, the user packet that is stored in the DRAM and indicated by the index information; and
- the cache submodule is configured to cache the user packet fetched by the fetch submodule into a second on-chip SRAM.

17. The apparatus according to claim 13, further comprising a zero-out module configured to perform a zero-out operation on the first on-chip SRAM and the second on-chip SRAM before the cache submodule caches the user packet fetched by the fetch submodule into the second on-chip SRAM.

18. The apparatus according to claim 14, further comprising a zero-out module configured to perform a zero-out operation on the first on-chip SRAM and the second on-chip SRAM before the cache submodule caches the user packet fetched by the fetch submodule into the second on-chip SRAM.

* * * * *